May 3, 1927. 1,627,516
E. LARSON
AUTOMATIC CURRIER AND OILER
Filed July 24, 1926     2 Sheets-Sheet 1
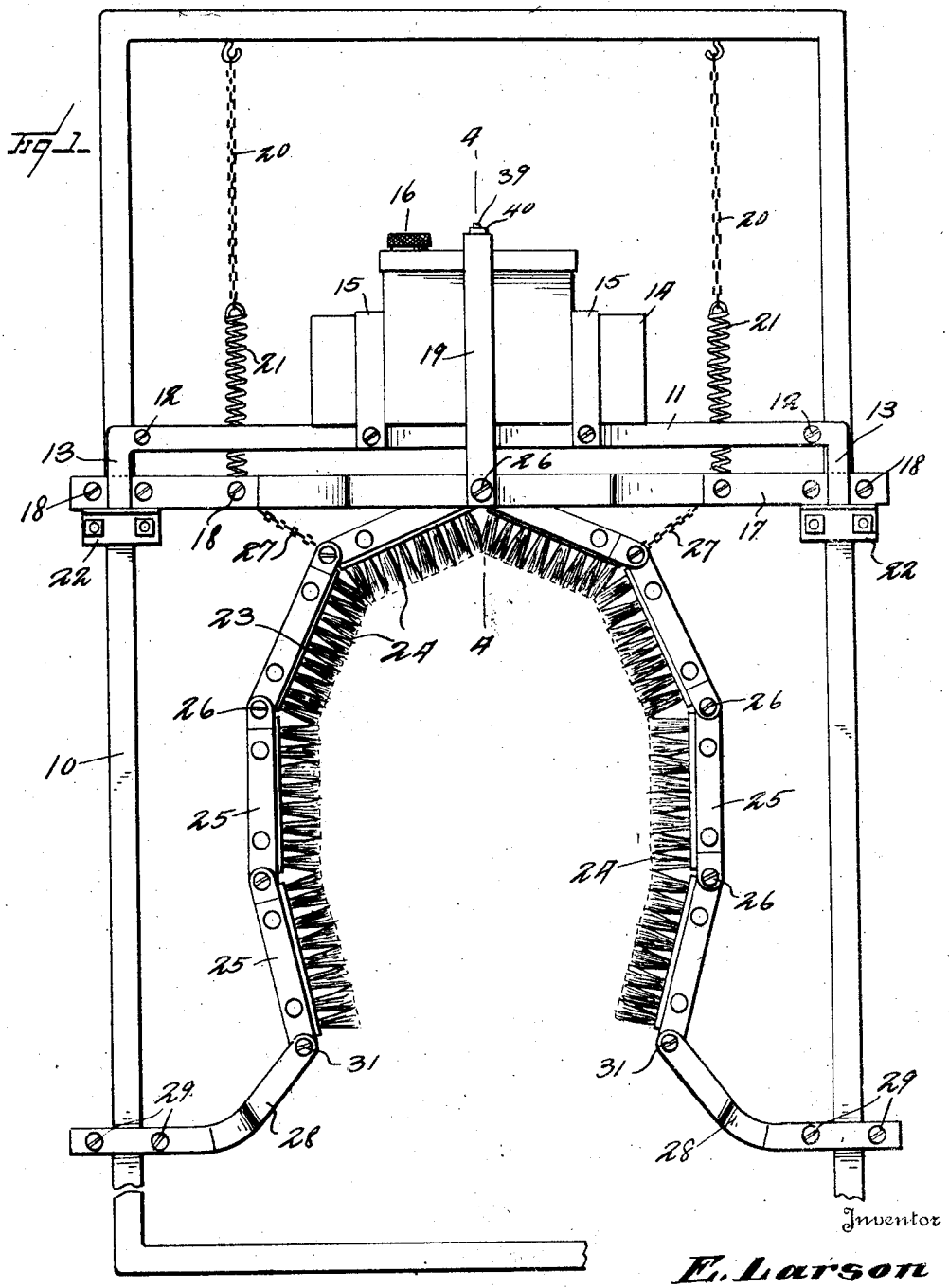

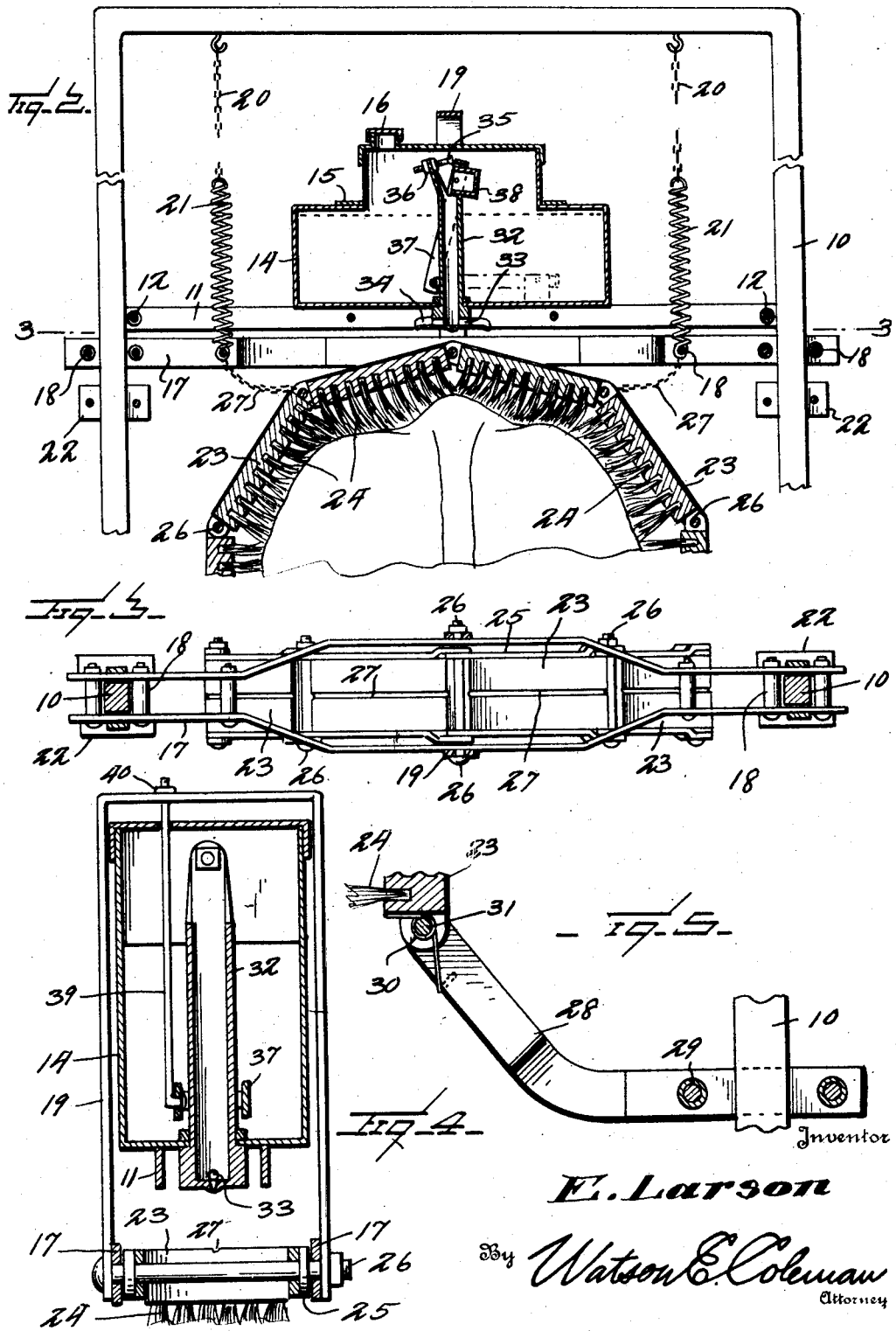

Patented May 3, 1927.

1,627,516

UNITED STATES PATENT OFFICE.

ERICK LARSON, OF PAULLINA, IOWA.

AUTOMATIC CURRIER AND OILER.

Application filed July 24, 1926. Serial No. 124,670.

This invention relates to automatic curriers and particularly to certain improvements in the currier described and claimed in my Patent No. 1,568,226, granted on January 5, 1926. The construction illustrated in my prior patent included a supporting frame and a transversely extending vertically slidable member carried by the frame and supported by springs, and a plurality of brushes hingedly connected to each other and extending downward and outward toward the frame and slidingly engaged with the frame so that when an animal passed between these two divergent lines of brushes, the brushes would ride over the back of the animal and conform to the contour thereof.

The general object of the present invention is to provide an oiling device in connection with the brushes constructed as described, so that as the animal moves between the brushes, oil will be applied to the brushes and will thus be applied to the animal.

A further object is to improve the means for connecting the lower ends of the brushes to the frame so as to permit of the free sliding movement of these parts, thus giving flexibility to the brushes.

A still further object is to so construct the brushes that oil will be discharged from the oil tank downward upon the brushes and this oil will trickle down the backs of the brushes and pass through apertures through the bristles thereof.

My invention is illustrated in the accompanying drawings wherein:—

Figure 1 is a front elevation of a currier constructed in accordance with my invention;

Fig. 2 is a fragmentary vertical sectional view through the upper portion of the currier;

Fig. 3 is a section on the line 3—3 of Figure 2;

Fig. 4 is a section on the line 4—4 of Figure 1;

Fig. 5 is a fragmentary section through one of the shackles.

Figure 6 is a fragmentary transverse section through the oil supply pipe showing the pivotal connection of the oil cup supporting lever with the supply pipe and the operating lever.

Referring to the drawings 10 designates an exterior frame which may be made of any suitable material and of any desired size, the frame being preferably rectangular. Extending transversely across the frame are the two parallel bars 11 which extend beyond the frame and are connected preferably inward of each side bar of the frame by bolts 12, there being space enough between these bolts to permit the frame to ride upward or downward easily on the frame. The bars 11 are preferably downwardly bent at their ends as at 13.

Mounted upon the bars 11 is an oil tank 14, the middle portion of which extends higher than the end portions and over these end portions pass the straps 15 which are bolted to the bars 11. The top of the tank is provided with a filling opening 16 and with a valve whose construction and operation will be later described.

Disposed below the supporting bars 11 are a pair of transversely extending bars 17 which extend beyond the vertical bars of the frame 10 and are held in sliding engagement with the frame by the transverse bolts 18 which are spaced sufficiently far apart to permit the bars 17 to move readily upon the frame. The middle portions of these bars 17 are outwardly bulged and a strap 19 of metal is bolted to the middles of these bars and extends up over and in spaced relation to the top of the tank 14. This strap 19 acts to operate the valve in the tank.

Chains 20 have their lower ends connected to coiled contractile springs 21 and act to support the bars 17 from the upper cross bar of the frame 10 and brackets 22 adjustably engaged with the side bars of the frame 10 act to limit the downward movement of the supporting bars 17 and of the tank supporting bars 11.

Extending downward from the supporting bars 17 are two downwardly divergent series of brushes, each brush consisting of a back 23 and bristles 24 and each brush having attached to it the laterally disposed metallic strips 25 which extend beyond the brushes and form means whereby the brushes may be pivotally connected to each other by bolts 26 passing through the extremities of the strips. The strap 19 is connected at its ends to one of these bolts 26. Each of the brush backs is formed with a longitudinally extending groove 27 whereby oil dripping from the tank may run down the brush backs and may be discharged onto the bristles at the joint between the brushes.

In order to hold the two upper brushes in an acutely angled relation to the bars 17 I provide chains 27 which extend to the bolts 18 to which the springs 21 are attached. Each of the lower brushes is loosely shackled to the vertical bars of the frame 10 so as to hold these lower brushes in proper position. Each of these shackles consists of two downwardly and outwardly angled members 28, the members being pivoted at their inner ends to the lower brush back and at their outer ends being connected by two bolts 29 disposed in spaced relation to each other and extending on each side of the vertical bar of the frame 10 in such spaced relation as to permit the easy movement of the shackle.

In order to hold each shackle in such position that its outer end portion will be at right angles to the vertical member of the frame 10, I provide a spring 30 which is coiled around the pivot bolt 31, one end of the spring being extended outward and bent to engage beneath one of the members 28. Thus, the shackles will always be held at right angles to the vertical frame members 10 and will be prevented from binding upon these frame members.

In order to provide for the discharge of oil onto the brushes from time to time, I provide a tank 14 with an upwardly extending discharge pipe 32 which extends slightly below the bottom of the tank and is provided with the two laterally disposed apertures 33 discharging onto the transversely extending deflector plate 34 having discharge lips located immediately above the grooves in the heads of the upper brushes. The upper end of the pipe 32 supports an adjustable stop 35 held in adjusted position by set nuts 36. Pivotally mounted upon the pipe 32 is a yoke 37 which carries a pivoted cup 38 so mounted that it will always remain in a horizontal position until the cup strikes the stop 35. The yoke 37 is pivoted to an actuating rod 39 which extends upward through an aperture in the top of the tank 14 and extends upward through the upper end of the strap 19 and carries a nut 40 bearing upon the top of the strap. As the bars 17 raise as an animal passes between the brushes, the yoke 19 will lift up on the rod 39 and this will cause the lever 37 to lift and the cup will strike against the edge of the pipe 32 and tilt and discharge its contents into the pipe 32. As soon as the animal has passed through the brushes and the bars 17 fall, the lever 37 will be returned to its initial position and the cup will again be filled. The stop 35, of course, limits the upward movement of the lever 37 to a position where the cup 38 will just strike the upper end of the pipe 32.

The operation of this mechanism will be obvious from what has gone before. The bars 11 and 17 may be both lifted or vertically adjusted so as to lift the brushes to a height proper for the animals which are to use this currier. The chains and springs 20 and 21 will act to resiliently support the tank and its supporting members and take away from shock after the animal has passed and the tank and its supporting members descend. As the animal passes through between the brushes, the brushes will spring into a position to more or less conform to the contour of the animal and the oil on the bristles will be applied to the animal. At the same time, the cup will be lifted to discharge oil into the pipe 32 and thus onto the brushes. As soon as the animal has passed, the brushes will descend to their initial position and it will be seen that the means for applying oil is such that only a relatively small amount of oil is supplied to the brushes at a time and the amount of oil supplied depends upon the number of animals which have passed through the brushes. Obviously the currier may be modified to suit particular animals without departing from the spirit of the invention. It is also obvious that many changes may be made in the details of construction and arrangement of parts without departing from the spirit of the invention as defined in the appended claims.

I claim:—

1. In a currier of the character described, a supporting frame, brush supporting members slidably mounted upon the frame, a brush operatively connected to the supporting members, an oil tank mounted upon the supporting frame, and means acting to cause the discharge of oil from the tank onto the brush when the brush is raised including a vertical discharge pipe within the tank, a lever pivoted within the tank, a cup carried by the lever, and means operatively connected to the supporting members for causing the lifting of the cup to discharge its contents into the pipe when the brush supporting members are lifted.

2. In a mechanism of the character described, a supporting frame, an oil tank carried thereby and having a discharge pipe, and means for discharging a predetermined amount of oil through the discharge pipe comprising a cup and a vertically shiftable member exteriorly of the tank and operatively connected to the cup to cause the cup to rise and discharge its contents into the top of the discharge pipe when the vertically shiftable member is raised.

3. A mechanism of the character described including a vertically shiftable brush, an oil tank mounted above the brush and having a discharge pipe discharging onto the brush, and means for causing a predetermined quantity of oil to be discharged through said pipe each time that the brush is raised including a lever, a cup mounted upon the lever and disposed within the tank, and means operatively connected to the brush for causing the lever to lift the cup and discharge its contents into the top of the discharge pipe when the brush is raised and cause the lowering of the cup when the brush is lowered.

4. An automatic currier of the character described comprising a supporting frame having laterally disposed vertical members, a transversely disposed support mounted upon said members, an oil tank carried thereby, transversely extending brush supporting bars mounted upon said members for limited vertical movement, downwardly and outwardly extending brushes flexibly connected to each other and connected to said bars, and means acting to cause the discharge of oil from the tank onto the brushes when the brushes are raised and including a vertical discharge pipe within the tank, a lever pivoted within the tank, a cup carried by the lever, and means operatively connected to said brush supporting bars for causing the lifting of the cup to discharge its contents into the pipe when the brush supporting bars are lifted.

5. An automatic currier of the character described comprising a supporting frame having laterally disposed vertical members, a transversely disposed support mounted upon said members, an oil tank carried thereby, transversely extending brush supporting bars mounted upon said members for limited vertical movement, downwardly and outwardly extending brushes flexibly connected to each other and connected to said bars, means acting to cause the discharge of oil from the tank onto the brushes when the brushes are raised and including a vertical discharge pipe within the tank, a lever pivoted within the tank, a cup carried by the lever, a yoke arching over the tank and pivotally connected to the brush supporting bars, and an actuating rod for said lever extending upward through the top of the tank and connected to said yoke whereby as the yoke rises, the lever will be raised to discharge the contents of the cup into the discharge pipe.

6. An automatic currier of the character described comprising a supporting frame having laterally disposed vertical members, a transversely disposed support mounted upon said members, an oil tank carried thereby, transversely extending brush supporting bars mounted upon said members for limited vertical movement, downwardly and outwardly extending brushes flexibly connected to each other and connected to said bars, means acting to cause the discharge of oil from the tank onto the brushes when the brushes are raised and including a vertical discharge pipe within the tank, a lever pivoted within the tank, a cup carried by the lever, a yoke arching over the tank and pivotally connected to the brush supporting bars, an actuating rod for said lever extending upward through the top of the tank and connected to said yoke whereby as the yoke rises, the lever will be raised to discharge the contents of the cup into the discharge pipe, and an adjustable stop carried by the pipe at its upper end and limiting the movement of the lever.

7. An automatic currier comprising a supporting frame having laterally disposed vertical members and a top cross bar, transversely extending bars slidingly engaged at their ends with the vertical members of the frame, adjustable stops limiting the downward movement of said cross bars, springs operatively supporting the cross bars from the top cross bar of the frame, tank supporting bars extending across the frame and having downwardly bent ends resting upon said stops, a tank carried by said last named cross bars, a series of pivotally connected brushes, the brushes extending downward and outward and at their lower ends having sliding engagement with the vertical members of the supporting frame, the middle of the series of brushes being pivotally connected to the brush supporting cross bars, a yoke arching over the tank and at its lower ends pivotally connected to said brush supporting cross bars, and means operated by the yoke for causing the discharge of oil from the tank onto the brushes when the brushes are actuated.

8. In an automatic currier, a supporting frame having vertical members, a transversely extending bar slidingly engaged with the frame, a series of flexibly connected brushes, the series being pivotally connected to the cross bar at the middle of the series and the brushes extending downward and outward from said pivotal support, and means for connecting the lower ends of the series of brushes to the vertical members of the supporting frame comprising shackles pivotally engaged with the lower brushes of the series and extending laterally outward on each side of the vertical members of the frame and slidingly engaged therewith, and springs operatively engaged with the lower brushes and yieldingly supporting said shackles in a position with their outer ends at right angles to the vertical members of the frame.

In testimony whereof I hereunto affix my signature.

ERICK LARSON.